US012365075B2

(12) United States Patent
Valentini

(10) Patent No.: US 12,365,075 B2
(45) Date of Patent: Jul. 22, 2025

(54) HAND-HELD POWER TOOL AS WELL AS AXIAL HOLDING ARRANGEMENT AND WORKING ELEMENT FOR SUCH A POWER TOOL

(71) Applicant: Andrea Valentini, Milan (IT)

(72) Inventor: Andrea Valentini, Milan (IT)

(73) Assignee: Andrea Valentini, Milan (IT)

( * ) Notice: Subject to any disclaimer, the term of this patent is extended or adjusted under 35 U.S.C. 154(b) by 0 days.

(21) Appl. No.: 18/632,415

(22) Filed: Apr. 11, 2024

(65) Prior Publication Data

US 2024/0351179 A1 Oct. 24, 2024

(30) Foreign Application Priority Data

Apr. 19, 2023 (EP) .................................... 23168811

(51) Int. Cl.
*B25F 3/00* (2006.01)
*B25F 5/02* (2006.01)

(52) U.S. Cl.
CPC . *B25F 3/00* (2013.01); *B25F 5/02* (2013.01)

(58) Field of Classification Search
CPC .................................... B25F 3/00; B25F 5/02
See application file for complete search history.

(56) References Cited

U.S. PATENT DOCUMENTS 6,640,377 B2 11/2003 Krause et al.
2008/0057842 A1* 3/2008 Lampka ................ B24B 23/028 451/357

(Continued)

FOREIGN PATENT DOCUMENTS

DE 20 2012 102220 U1 7/2012
DE 102020213232 A1 * 4/2022

(Continued)

OTHER PUBLICATIONS

English language Abstract of DE202012102220U1.

*Primary Examiner* — Eyamindae C Jallow
(74) *Attorney, Agent, or Firm* — William J. Maguire; WARE FRESSOLA MAGUIRE & BARBER LLP

(57) ABSTRACT

The invention refers to hand-held power tool (10) comprising a tool housing (12), a motor (24) and a tool shaft (36) having a rotational axis (40) and actuated by the motor (24), and further comprising a working element (38) releasably attachable to the tool shaft (36) from outside the tool housing (12) in an axial direction and, after attachment to the tool shaft (36), held in respect to the tool shaft (36) by means of an axial holding arrangement (80). The axial holding arrangement (80) comprises a first element (36; 38) constituted by one of the working element (38) and the tool shaft (36) and a second element (38; 36) constituted by the other one of the working element (38) and the tool shaft (36), and at least two locking elements (70) assigned to the first element (36; 38) movably in a radial direction between a retracted position and a locking position, at least one recess (66) assigned to the second element (38; 36) for receiving the locking elements (70) when in their locking positions. The locking elements (70) or the second element (38; 36) in and/or around the at least one radial recess (66) comprises a magnetic material and the at least other one of the locking elements (70) and the second element (38; 36) in and/or around the at least one radial recess (66) comprises a magnetic material or a ferromagnetic material. The locking elements (70) are automatically moved into and held in their locking positions and in the at least one radial recess (66) by means of magnetic force after attachment of the working element (38) to the tool shaft (36).

21 Claims, 5 Drawing Sheets

(56) References Cited

U.S. PATENT DOCUMENTS

| | | | | |
|---|---|---|---|---|
| 2008/0254725 | A1* | 10/2008 | Henning | B24B 23/02 451/510 |
| 2011/0036604 | A1* | 2/2011 | Worsnop | B25F 3/00 279/144 |
| 2022/0168863 | A1* | 6/2022 | Ahmad | B24B 23/03 |
| 2024/0149387 | A1* | 5/2024 | Valentini | B24B 47/00 |

FOREIGN PATENT DOCUMENTS

| | | | | |
|---|---|---|---|---|
| EP | 3012068 | A1 * | 4/2016 | B24B 23/005 |
| EP | 3 501 732 | A1 | 6/2019 | |
| EP | 3 854 523 | A1 | 7/2021 | |
| EP | 3 892 419 | A1 | 10/2021 | |

* cited by examiner

HAND-HELD POWER TOOL AS WELL AS AXIAL HOLDING ARRANGEMENT AND WORKING ELEMENT FOR SUCH A POWER TOOL

BACKGROUND OF THE INVENTION

Field of the Invention

The present invention refers to a hand-held power tool comprising a tool housing and a motor located therein and a tool shaft having a rotational axis, actuated by the motor when in operation in order to make the tool shaft perform a rotational movement about its rotational axis, a distal end of the tool shaft being accessible from outside the tool housing. The power tool further comprises a working element releasably attachable to the distal end of the tool shaft from outside the tool housing in an axial direction extending parallel to the rotational axis of the tool shaft and, after attachment to the tool shaft, held in the axial direction in respect to the tool shaft by means of an axial holding arrangement.

Furthermore, the invention refers to an axial holding arrangement for holding a working element of a hand-held power tool in respect to a tool shaft of the power tool in an axial direction extending parallel to a rotational axis of the tool shaft after attachment of the working element from outside a tool housing to a distal end of the tool shaft in the axial direction. Finally, the present invention also refers to a working element of a hand-held power tool, configured for releasable attachment to a tool shaft of the power tool in an axial direction extending parallel to a rotational axis of the tool shaft and further configured to be held in the axial direction by means of an axial holding arrangement after attachment of the working element to the tool shaft.

Prior Art

A hand-held power tool of the above-mentioned kind in the form of an angular sanding or polishing power tool is known, for example, from US 2011/036 604 A1 (Chervon Ltd.). The power tool comprises a tool housing and an electric motor located therein. A tool shaft of the power tool is brought into a rotational movement about its rotational axis by means of the electric motor. A distal end of the tool shaft is accessible from outside the tool housing. The power tool further comprises a working element which can be releasably attached to the distal end of the tool shaft from outside the tool housing in an axial direction extending parallel to the rotational axis of the tool shaft. After attachment of the working element to the tool shaft, the working element is held in respect to the tool shaft in the axial direction by means of an axial holding arrangement.

A first type of working element comprises an eccentric element and a backing pad. The backing pad is attached to the eccentric element in a manner freely rotatable about a second rotational axis of the backing pad, extending parallel in respect to the rotational axis of the tool shaft and in a distance thereto. The eccentric element is releasably attached to the tool shaft in the axial direction and held in respect thereto by means of an axial holding arrangement. A second type of working element comprises only a backing pad which is releasably attached to the tool shaft in the axial direction and held in respect thereto by means of an axial holding arrangement.

A distal end of the tool shaft is provided with an axial bore configured to receive a cylindrical pin assigned to the eccentric element of the first type of working element or, alternatively, assigned to the backing pad of the second type of working element. A proximal end of the cylindrical pin comprises an annular recess extending on an external circumferential surface of the pin. A hollow cylindrical jacket radially delimiting the axial bore of the tool shaft has two opposing locking elements which are each movable in a radial direction between a retracted position and a locking position. In the retracted positions the locking elements do not engage with the annular recess provided in the proximal end of the cylindrical pin giving free an axial passage along the axial bore and allowing attachment of the working element to the tool shaft and/or detachment and removal of the working element from the tool shaft in the axial direction. In the locking positions the locking elements engage with the annular recess, thereby holding the working element in respect to the tool shaft in the axial direction.

Each of the locking elements is designed as a lever element which may swivel about a swivelling axis extending in the hollow cylindrical jacket of the tool shaft in a tangential manner in respect to the rotational axis of the tool shaft. The locking elements are held in their locking positions by means of a spring element. The locking elements may be brought into their retracted positions against the force of the spring element by means of a manually actuated actuation device in the form of a push button. The lever elements each have a front end on a first side of the swivelling axis engaging with the annular recess assigned to the working element, when the lever elements are in their locking positions, and an opposite rear end on an opposite second side of the swivelling axis configured to be actuated by the actuation device and the spring element.

A disadvantage of the known power tool is the large number of movable parts, the rather complex and filigree design and the rather complicated operation of the axial holding arrangement by a user of the power tool, which is particularly difficult when the user wears working gloves.

SUMMARY OF THE INVENTION

Therefore, it is an object of the present invention to simplify the design and operation of the axial holding arrangement of a hand-held power tool, in particular allowing actuation of the axial holding arrangement and attachment/detachment/removal/replacement of a working element by a user even when wearing working gloves.

In order to solve the object of the present invention a hand-held power tool comprising the features of claim 1 is suggested. In particular, starting from the hand-held power tool of the above-identified kind, it is suggested that the axial holding arrangement comprises

- a first element constituted by one of the following elements, the working element and the tool shaft, and a second element constituted by the other one of the elements, the working element and the tool shaft, and
- at least one locking element assigned to the first element movably in a radial direction between a retracted position, in which the at least one locking element is retracted in the first element, and a locking position, in which the at least one locking element protrudes from the first element radially towards the second element,
- at least one recess assigned to the second element and having a radial extension, the at least one radial recess being configured to receive part of the at least one locking element when in its locking position after attachment of the working element to the tool shaft,
- wherein at least one of the following elements, the at least one locking element and the second element in and/or around the at least one radial recess, comprises a magnetic material and the at least other one of the elements, the at least one locking element and the second element in and/or around the at least one radial recess, comprises a magnetic material or a ferromagnetic material, so that the at least one locking element is automatically moved into and held in its locking position and in the at least one radial recess by means of magnetic force after attachment of the working element to the tool shaft, thereby engaging with the at least one radial recess and holding the working element in respect to the tool shaft in the axial direction.

When mentioning a plurality of locking elements hereinafter, it is always intended to refer to at least one locking element. An advantage of the present invention is that the locking elements automatically enter into engagement with the at least one radial recess once the working element has been attached to the tool shaft in the axial direction. The automatic entering into engagement is realized by means of magnetic force acting in an essentially radial direction between the locking elements and the respective at least one radial recess. With other words, once the working element has been attached to the tool shaft in the axial direction, the locking elements are forced into engagement with the respective at least one radial recess by means of magnetic force acting between the locking elements and the at least one recess and/or material of the second element surrounding the radial recess, respectively.

The engagement of the locking elements with the at least one radial recess is preferably a mechanical engagement. The locking elements held in the first element mechanically engage with the at least one radial recess in the second element and prevent a relative axial movement between the first element and the second element. To this end, part of the locking elements remains in the first element and another part of the locking elements enters into the at least one radial recess.

The invention has the further advantage that no separate spring element is necessary to urge the locking elements into their locking positions. Similarly, no manually actuated actuation device is necessary for moving the locking elements into their retracted positions. Upon attachment of the working element to the tool shaft in a first axial direction, the locking elements are automatically moved into their locking positions due to the magnetic force acting between the locking elements themselves and/or the locking elements and the at least one radially extending recess. In order to remove the working element from the tool shaft the user simply grasps the working element with one hand and pulls it into a second axial direction opposite to the first axial direction. This automatically makes the locking elements move into their retracted positions against the magnetic force and allows a removal of the working element from the tool shaft in the axial direction.

To this end, it is suggested that the at least one locking element or the second element at least in the region of the at least one radial recess comprise a magnetic material. The other one of the two elements, i.e., the second element at least in the region of the at least one radial recess or the at least one locking element, comprises a magnetic or a ferromagnetic material in order to realize a magnetic attraction and consequently a magnetic force between the locking elements and the at least one radial recess and to hold the locking elements in the at least one radial recess by means of the magnetic force, after attachment of the working element to the tool shaft.

With other words, the following embodiments may be realized according to the present invention:

- the one or more locking elements comprise or are made of a magnetic material and the second element in the region of the one or more radial recesses comprises or is made of a ferromagnetic material, e.g., iron, steel,
- the one or more locking elements comprise or are made of a magnetic material and the second element in the region of the one or more radial recesses comprises or is made of a magnetic material having an opposite polarity than the magnetic material of the one or more locking elements, and
- the one or more locking elements comprise or are made of a ferromagnetic material, e.g., iron, steel, and the second element in the region of the one or more radial recesses comprises or is made of a magnetic material.

It is emphasized that the present invention works perfectly well, even if the first element comprises only a single locking element. Due to the magnetic force between the locking element and the respective recess and/or material of the second element surrounding the radial recess, respectively, that locking element automatically moves into its locking position and enters into engagement with the respective recess, once the working element has been releasably attached to the tool shaft in the axial direction.

If the locking elements assigned to the first element are made of a permanent magnetic material, the locking elements are magnetically attracted by each other and consequently made to move radially inwards and to be held in their locking positions, even if the working element is not attached to the tool shaft. If the working element is attached to the tool shaft in the axial direction, the locking elements will automatically enter into the at least one recess assigned to the second element, due to the mutual magnetic interaction between the locking elements. This would work perfectly well even if the tool shaft does not comprise a magnetic or ferromagnetic material in and/or around the at least one radial recess. To this end, the tool shaft could be entirely made of a not magnetic and not ferromagnetic material, e.g., of a plastic material or a not magnetic and not ferromagnetic material, for instance aluminium. Of course, if the tool shaft does comprise a magnetic or ferromagnetic material in and/or around the at least one radial recess, the radially acting magnetic force with which the locking elements are held in the at least one radially extending recess, after attachment of the working element to the tool shaft, would be stronger. To this end, the tool shaft could be made of a ferromagnetic material, e.g., steel.

The first element holding the at least one locking element, is preferably made of a non-magnetizable material, such as plastic or aluminium, if the at least one locking element is made of a permanent magnetic material. This allows free movement of the locking elements in the radial direction due to the magnetic force acting between the locking elements themselves and/or the locking elements and the respective at least one radial recess. The locking elements are not held back in the first element due to magnetic force acting between the locking elements and the first element. The one or more locking elements may have an essentially spherical design. Alternatively, it is also contemplated that the one or more locking elements have an essentially cuboid form. Opposing edges of a rectangular surface of a cuboid locking element facing the second element may be rounded or tapered. The locking elements are oriented in such a manner that the surface with the rounded or tapered edges extends towards the second element and into the at least one recess, when the working element is attached to the tool shaft in the axial direction. Preferably, the rounded or tapered edges of the locking elements face in opposite directions along the rotational axis of the tool shaft, i.e., upwards and downwards, when the rotational axis extends in a vertical direction.

The working element may have different forms. A first type of working element may comprise an eccentric element and a backing pad. The backing pad is attached to the eccentric element in a manner freely rotatable about a second rotational axis of the backing pad, extending parallel in respect to the rotational axis of the tool shaft and in a distance thereto. The eccentric element is releasably attached to the tool shaft in the axial direction and held in respect to the tool shaft in the axial direction by means of the axial holding arrangement.

The backing pad may have a bottom surface configured for releasable attachment of a sanding or a polishing member thereto, e.g., by means of a Velcro® attachment layer. The sanding member may comprise, e.g., a sanding paper or a sanding fabric. The polishing member may comprise, e.g., a pad comprising a sponge or foam-like material, wool, micro-fibre or the like polishing material. The backing pad may be made of metal and/or plastic material.

In the first type of working element, the eccentric element may be provided with a bearing in which part of the backing pad is directly or indirectly held in a manner freely rotatable in respect to the eccentric element.

To this end, according to an embodiment of the invention, a top surface of the backing pad may comprise a cylindrical pin which is directly or indirectly held in the eccentric element in a manner freely rotatable about the second rotational axis, in particular in a bearing attached to or embedded in a bottom surface of the eccentric element. Further, the eccentric element may comprise a spindle which is held in the bearing in a manner freely rotatable about the second rotational axis. The cylindrical pin of the backing pad may be attached to a distal end of the spindle or may form an integral part of the spindle. After attachment to the spindle, the backing pad is freely rotatable in respect to the eccentric element about the second rotational axis together with the spindle.

Instead of the cylindrical pin, the backing pad could comprise a recess on its top surface, wherein the recess is configured to receive a distal end of the spindle in an axial direction. For attachment of the backing pad to the distal end of the spindle, the distal end of the spindle is inserted into the recess in an axial direction.

In both embodiments (the backing pad comprising a cylindrical pin or a recess on its top surface), after attachment of the backing pad to the distal end of the spindle, the backing pad is held in respect to the spindle in the axial direction, for instance, by means of a threaded connection, magnetic force, a screw or the like. In the case of a screw, the screw may be passed through a centre hole of the backing pad from below and screwed into a threaded axial bore in the distal end of the spindle on the top surface of the backing pad, thereby clamping the backing pad between a screw head and the distal end of the spindle. It would also be possible to realize the holding of the backing pad in respect to the spindle in the axial direction by means of the axial holding arrangement according to the invention.

On a side opposite to the backing pad, the eccentric element may comprise a further cylindrical pin with which the first type of working element may be attached to the tool shaft in the axial direction, for instance by insertion of the further cylindrical pin into an axial bore in a distal end of the tool shaft. The cylindrical pin may be attached to the eccentric element in a torque proof manner or may form an integral part thereof. Alternatively, on the side opposite to the backing pad, the eccentric element may comprise a recess or bore with which the first type of working element may be attached to the tool shaft in the axial direction, for instance by receiving a distal end of the tool shaft in the recess or bore of the eccentric element. Holding of the eccentric element in respect to the tool shaft in the axial direction may be achieved by means of the axial holding arrangement according to the invention.

Attachment of the eccentric element to the tool shaft is preferably such that a torque can be transmitted from the tool shaft to the eccentric element during intended use of the power tool. When attached to the eccentric element of the first type of working element in the described manner, the backing pad performs a random-orbital movement during intended use of the power tool, i.e., a superposition of a forced rotation about the first rotational axis and a free rotation about the second rotational axis.

If a free rotation of the backing pad in respect to the tool housing is limited or prevented, the backing pad will perform an orbital or eccentric movement. Free rotation of the backing pad, may be limited or prevented, for instance, by means of corresponding magnetically interacting magnetic elements (permanent magnets and/or ferromagnetic elements) assigned to the backing pad on the one hand and to the tool housing on the other hand, similar to what is suggested in EP 3 501 732 A1, which is incorporated herein by reference in its entirety. Alternatively, the free rotation of the backing pad may be limited or prevented by elastic means, e.g., an elastic collar or several elastic elements, interconnecting a top surface of the backing pad with the tool housing.

A second type of working element may comprise a backing pad only, which is releasably attached to the tool shaft in the axial direction. The backing pad may comprise a bottom surface configured for releasable attachment of a sanding or polishing member thereto, e.g., by means of a Velcro® attachment layer, and a top surface configured for attachment to a distal end of the tool shaft in a manner such that a torque can be transmitted from the tool shaft to the backing pad during intended use of the power tool. The attachment may be realized directly between the top surface of the backing pad and the tool shaft or by means of an extension rod, interposed between the top surface of the backing pad and the distal end of the tool shaft. Holding of the backing pad in respect to the tool shaft in the axial direction may be achieved by means of the axial holding arrangement according to the invention. When attached to the backing pad of the second type of working element in the described manner, the backing pad performs a rotational movement about the first rotational axis of the tool shaft during intended use of the power tool. In this case, the first rotational axis of the tool shaft and the second rotational axis of the backing pad are congruent.

In one embodiment, a top surface of the working element facing the distal end of the tool shaft may have a cylindrical pin, wherein the distal end of the tool shaft is provided with an axial bore extending along the first rotational axis of the tool shaft. For attachment of the working element to the tool shaft, the cylindrical pin of the working element may be inserted into the axial bore of the tool shaft.

In another embodiment, a top surface of the working element facing the distal end of the tool shaft may have an axial bore, wherein the distal end of the tool shaft is provided with a cylindrical pin-shaped section (referred to hereinafter as cylindrical pin) extending along the first rotational axis of the tool shaft. For attachment of the working element to the tool shaft, the cylindrical pin of the tool shaft may be inserted into the axial bore of the working element.

According to a preferred embodiment of the invention, it is suggested that the first element is the tool shaft and the second element is the working element. Thus, in this embodiment, the tool shaft holds the locking elements in a radially movable manner and the working element is provided with the at least one radially extending recess. In particular, a circumferential surface of an element attached to or forming part of the working element may be provided with the at least one radial recess. Such an element attached to the working element or forming part thereof may be, for instance, a cylindrical pin or an axial bore. In the case of a cylindrical pin, the at least one recess may be provided on an external circumferential surface of the pin. In the case of an axial bore, the at least one recess would be provided on an internal circumferential surface of the bore.

Depending on the design of the tool shaft and of the working element, the locking elements move radially outwards or radially inwards in order to reach their locking positions. If a distal end of the tool shaft is provided with an axial bore for receiving a cylindrical pin of the working element, the locking elements will move radially inwards to reach their locking positions. If a distal end of the tool shaft comprises a cylindrical pin for insertion into an axial bore of the working element, the locking elements will move radially outwards to reach their locking positions.

Similarly, depending on the design of the tool shaft and of the working element, the at least one radial recess may be provided on an external or an internal circumferential surface of the working element. If the working element is provided with a cylindrical pin, the at least one radial recess may be provided on an external circumferential surface of the pin. Alternatively, if the working element is provided with an axial bore, the at least one recess will be provided on an internal circumferential surface of the bore.

According to another preferred embodiment of the invention, it is suggested that the first element is the working element and the second element is the tool shaft. Thus, in this embodiment, the tool shaft is provided with the at least one radially extending recess and the working element holds the locking elements in a radially movable manner. In particular, a circumferential surface of an element attached to or forming part of the tool shaft may be provided with the at least one radial recess. Such an element attached to the tool shaft or forming part thereof may be, for instance, a cylindrical pin or an axial bore at a distal end of the tool shaft. In the case of a cylindrical pin, the at least one recess may be provided on an external circumferential surface of the pin. In the case of an axial bore, the at least one recess would be provided on an internal circumferential surface of the bore.

Depending on the design of the tool shaft and of the working element, the locking elements move radially outwards or radially inwards in order to reach their locking positions. If a top surface of the working element is provided with an axial bore for receiving a cylindrical pin of the tool shaft, the locking elements will move radially inwards to reach their locking positions. If a top surface of the working element comprises a cylindrical pin for insertion into an axial bore of the tool shaft, the locking elements will move radially outwards to reach their locking positions.

Similarly, depending on the design of the tool shaft and of the working element, the at least one radial recess may be provided on an external or an internal circumferential surface of the tool shaft. If a distal end of the tool shaft comprises a cylindrical pin, the at least one radial recess may be provided on an external circumferential surface of the pin. Alternatively, if the distal end of the tool shaft comprises an axial bore, the at least one recess will be provided on an internal circumferential surface of the bore.

Preferably, a distal end of the cylindrical pin has a tapered or rounded surface in order to automatically push the locking elements apart and radially outwards into their retracted positions during insertion of the cylindrical pin into the respective axial bore. Additionally or alternatively, an outer edge delimiting an entry hole into an axial bore may have a tapered or rounded surface in order to facilitate introduction of the respective cylindrical pin into the axial bore.

It is suggested that the axial bore and the cylindrical pin have axially extending sections with a corresponding non-rotational cross-sectional surfaces, the sections configured to mechanically engage with each other after insertion of the cylindrical pin into the axial bore and attachment of the working element to the tool shaft in the axial direction. Preferably, the sections automatically enter into engagement with each other upon insertion of the cylindrical pin into the respective axial bore, thereby permitting the transmission of torque from the tool shaft to the working element during intended use of the power tool. It is suggested that the non-rotational cross-sectional surface has the form of a polygon, e.g., a triangle, a square, a pentagon, a hexagon, an octagon or the like, preferably having equal side lengths.

In this embodiment, the locking elements and the respective at least one recess are exclusively provided for holding the working element in respect to the tool shaft in the axial direction. In particular, the axial holding arrangement does not serve and the locking element(s) and the recess(es) do not serve for transmitting torque about the rotational axis of the tool shaft from the tool shaft to the working element. This significantly increases durability and strength of the axial holding arrangement and, thus, of the entire power tool. When attaching the working element to the tool shaft in the axial direction, the corresponding sections with the non-rotational cross-sectional surfaces automatically enter into engagement with each other and allow transmission of torque.

According to another preferred embodiment, it is suggested that a surface of the radially movable locking elements facing the second element after attachment of the working element to the tool shaft and/or an outer edge delimiting an entry hole opening into the at least one radially extending recess and facing the first element after attachment of the working element to the tool shaft, has a tapered or rounded surface in order to facilitate automatically pushing the locking elements in radial directions into their retracted positions during detachment of the working element from the tool shaft. The tapered or rounded surface(s) serve for redirecting the direction of forces acting on the locking elements from an axial direction (due to the detaching and removing of the working element from the tool shaft in the axial direction) into a radial direction (for moving the locking elements into their retracted positions).

Furthermore, it is suggested that the locking elements and the at least one radial recess are correspondingly shaped at least in those sections with which they engage (preferably mechanically) with each other in the locking positions of the locking elements. This provides for a safe and reliable locking position of the locking elements in the respective at least one radial recess without mechanical play that could lead to a rattling noise or the like during operation of the power tool. In particular, a backlash-free connection between the working element and the tool shaft can be realized.

According to a preferred embodiment of the invention, it is suggested that the locking elements are equidistantly positioned in a circumferential direction about the rotational axis of the tool shaft or the second rotational axis of the working element, respectively, after attachment of the working element to the tool shaft. Preferably, the axial holding arrangement comprises at least two, preferably at least three, particularly preferred at least four locking elements. Two locking elements would be located opposite to each other and in a circumferential distance of 180° in respect to each other. Three locking elements would be located in a circumferential distance of 120° in respect to each other. Four locking elements would be located in a circumferential distance of 90° in respect to each other. Larger power tools, in particular with larger dimensions of the tool shaft and the working element and with higher weights of the working element can make a higher number of locking elements recommendable.

According to an embodiment of the invention, the axial holding arrangement comprises the same number of one or more radial recesses as there are locking elements provided in the axial holding arrangement. Alternatively, the axial holding arrangement comprises a single annularly shaped radial recess configured to receive at least part of all locking elements present in the axial holding arrangement.

It is emphasized that the axial holding arrangement according to the present invention can be used with various types of power tools, where a rotating element has to be attached and held in an axial direction in respect to a tool shaft. For instance, the axial holding arrangement can provide for holding a working element, e.g., a backing pad with or without an eccentric element, in respect to the tool shaft of a polishing or sanding machine in the axial direction. Furthermore, the axial holding arrangement could also be used for holding a chuck of a drill, a hammer drill or a cordless screwdriver in respect to the tool shaft in the axial direction. Further, the axial holding arrangement could also be used for holding a grinding wheel in respect to a tool shaft of a grinding machine in the axial direction.

Further features and advantages of the present invention will become apparent from the embodiments described hereinafter with reference to the accompanying drawings. It is emphasized that each of the features shown in the figures and possibly described hereinafter with reference to a certain embodiment may be important to the invention on its own or in the context of another embodiment even if not explicitly shown in the figures and/or described in the subsequent description. In particular, one or more features shown in the figures may be combined with any other one or more features of another figure, even if belonging to different embodiments.

BRIEF DESCRIPTION OF THE DRAWING

The drawing includes FIGS. 1-6, which show.

DETAILED DESCRIPTION OF THE INVENTION

Figures 1, 2:
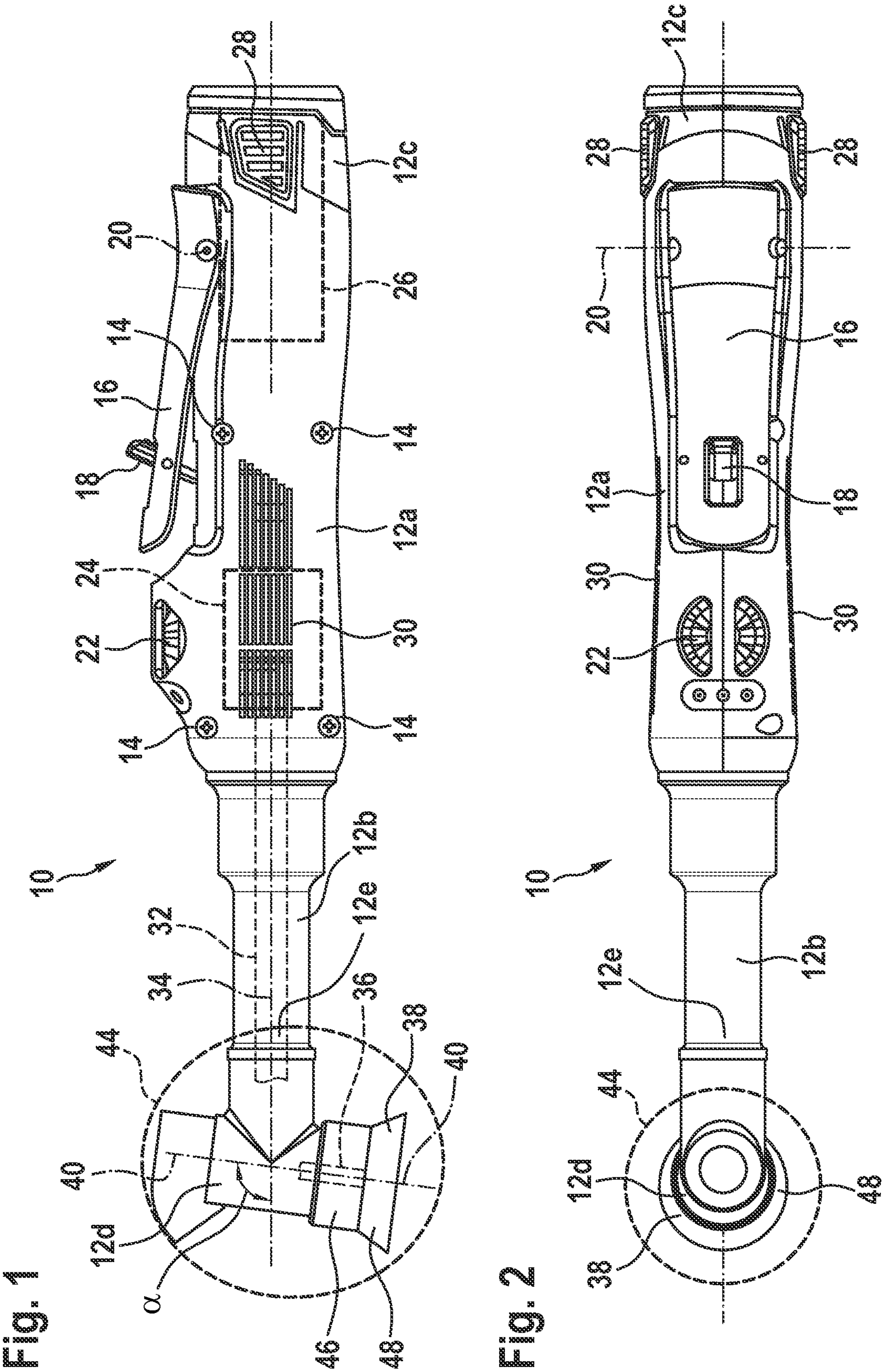
FIG. 1 a side view of a power tool according to the present invention according to a preferred embodiment.
FIG. 2 a top view of the power tool of FIG. 1.

FIGS. 1 and 2 show a side view and a top view, respectively, of a hand held and/or hand guided power tool 10 embodied as a polishing machine or as a polisher. Alternatively, the power tool 10 according to the present invention could also be embodied as a sander or a grinder, or even as a drill, a cordless screw driver, or a mixer, only to mention a few examples.

The polisher 10 comprises a housing 12 made up of essentially two main parts, a rear part 12*a* and a front part 12*b*. In more detail the housing 12 comprises the rear part 12*a*, a distal end part 12*c*, the front part 12*b* and a front casing 12*d*. The rear part 12*a* is preferably made of a rigid plastics material. Of course, the rear part 12*a* of the housing 12 could also be made of a different rigid material, for example metal or carbon fibre. Further, the rear part 12*a* of the housing 12 could comprise regions provided with resilient material like a soft plastic material or rubber in order to ensure safe and comfortable gripping, holding and guiding of the power tool 10 by a user. The rear part 12*a* of the housing 12 is preferably divided by means of an essentially vertical plain into two half shells which are attached on one another along the vertical plane and held together by screws 14.

The rear part 12*a* of the housing 12 comprises an actuation lever 16 co-operating with a switch, preferably located inside the housing 12, for turning on and off the polisher 10. The actuation lever 16 may comprise a blocking mechanism 18 for avoiding unintentional activation of the tool 10. The actuation lever 16 is rotatable about a rotational axis 20 extending perpendicular in respect to a longitudinal extension of the housing 12. In the embodiment shown in FIGS. 1 and 2, the actuation lever 16 is located on a top side of the housing 12. Of course, it would also be possible to locate the lever 16 on a bottom side of the housing 12 (not shown). It is also conceivable, to use one or more push buttons or a rotary switch instead of the lever 16 to actuate the power tool 10.

Furthermore, in the embodiment of FIGS. 1 and 2 the rear part 12*a* of the housing 12 is provided with a turn wheel 22 for speed regulation of a tool's motor 24. The rotary wheel 22 may co-operate with a potentiometer, preferably located inside the housing 12. Of course, it is also conceivable, to provide the actuation lever 16 or the one or more push buttons or the rotary switch with a speed regulation functionality. In that case the turn wheel 22 could be omitted.

A distal rear end 12*c* of the rear part 12*a* can be removed from the rest of the housing 12 in order to withdraw a battery 26 from the inside of the rear part 12*a* of the housing 12. The battery 26 provides the polisher 10 and its electronic components, respectively, with electric energy necessary for their operation. Of course, the polisher 10 could also be operated with electric energy from a mains power supply. In that case the battery 26 would not be necessary and the receptacle for the battery 26 in the housing 12 could be used for accommodating a transformer and other electric circuitry for transforming the mains voltage (e.g., 100V or 250V AC and 50 Hz or 60 Hz) into an operating voltage (e.g., 12V, 18V, or 24V DC) for the electronic components of the polisher 10, corresponding to a voltage supplied by the battery 26.

The distal end 12*c* of the housing 12 may be secured to the rear part 12*a* by means of a snap-action connection comprising two opposite lateral snap-releasing knobs 28 for releasing the snap-action connection. For removing the distal rear end 12*c* from the rear part 12*a* of the housing 12, the lateral snap-releasing knobs 28 are pressed, thereby releasing the snap-action connection and allowing separation of the distal end 12*c* of the housing 12 from the rear part 12*a* and withdrawal of the battery 26 from the housing 12. The distal end 12*c* of the housing 12 may be attached to the battery 26 or it may be in the form of a separate lid for closing the receptacle for the battery 26 independently.

The rear part 12*a* of the housing 12 may be provided with a plurality of cooling vents 30 of any desired shape and extension enabling an airstream from the inside of the housing 12 into the environment and cooling of the electronic components located inside the housing 12 during operation of the power tool 10.

The front part 12*b* of the housing 12 is essentially tube-shaped and serves for receiving and guiding a driving shaft 32, e.g., by means of one or more bearings (e.g., bearing 86 in FIGS. 3 and 6), during its rotation about a rotational axis 34. The driving shaft 32 is driven by the motor 24. To this end, the driving shaft 32 may form an integral part with a motor shaft or may be attached thereto. The tube-shaped front part 12*b* is preferably made of a metal, e.g., Aluminium, or a rigid plastic material. The front part 12*b* may be releasably attached to the rear part 12*a* of the housing 12, e.g., by means of a threaded connection or by screws. It is also conceivable to simply sandwich a rear end of the front part 12*b* between the two half shells which form the rear part 12*a* of the housing 12. By fixing the two half shells together, e.g., by means of the screws 14, the front part 12*b* may be held and fixed in respect to the rear part 12*a* of the housing 12. Alternatively, the front part 12*b* forms an integral part with the rear part 12*a*. In particular, it is conceivable that the front part 12*b* also comprises two half shells which each may form an integral part with the respective half shells of the rear part 12*a* of the housing 12.

Located inside the rear part 12*a* of the housing 12 is an electric motor 24, which is preferably embodied as a brushless (BL) motor, in particular a BL direct current (BLDC) motor. Furthermore, located between the motor shaft and the driving shaft 32, there may be a first gear mechanism (not shown) which can set a certain transmission ratio between the rotational speed of the motor shaft and the rotational speed of the driving shaft 32. Depending on the design of the gear mechanism, the ratio can be 1, larger than 1 or smaller than 1. Usually, the ratio will be larger than 1 because the motor shaft rotates faster than the driving shaft 32.

The power tool 10 may comprise a second gear mechanism 42 (see FIGS. 3 and 6), which may be provided for translating the rotational movement of the driving shaft 32 about the rotational axis 34 into a rotational movement of a tool shaft 36 (see FIGS. 3 and 6) of the power tool 10 about a further rotational axis 40. The two rotational axes 34, 40 intersect at a certain angle α between approximately 70° and 110°, in particular around 90°. In the embodiment of FIGS. 1 and 2, the angle α of the two rotational axes 34, 40 is approximately 98°. The tool shaft 36 actuates a working element 38 of the power tool 10.

A front end of the driving shaft 32, the second gear mechanism 42 and the tool shaft 36 are preferably located in a tool head 44 which is attached to a front end 12*e* of the front part 12*b* of the tool housing 12. The tool head 44 preferably comprises a tube-like front casing 12*d* which serves for receiving and guiding the tool shaft 36, e.g., by means of one or more bearings (e.g., bearing 88 in FIGS. 3 and 6), during its rotation about the rotational axis 40. The tool head 44 is preferably an integral part of the front part 12*b* of the housing 12. It is preferably made of the same material as the tube-like front part 12*b*. A protective shroud 46 is releasably attached to a bottom end of the tube-like front casing 12*d* surrounding at least part of the working element 38, for instance an eccentric element 54 (see FIGS. 3 and 6) or an extension rod (not shown), interconnecting a distal end of the tool shaft 36 with a backing pad 48 of the working element 38.

Figure 3:
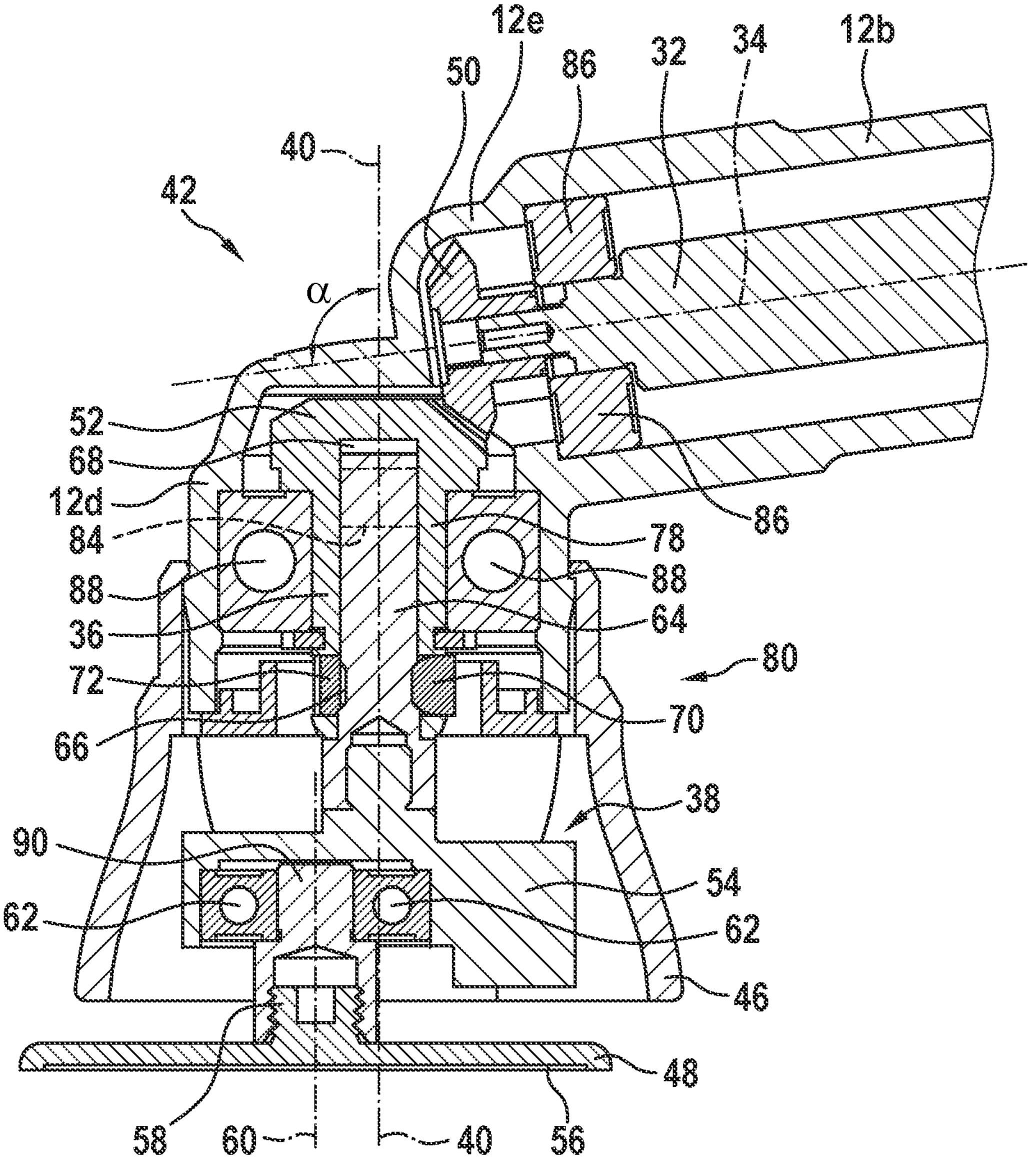
FIG. 3 a tool head of a power tool according to the present invention according to another preferred embodiment in a cross-sectional view along a vertical plane.
Figure 6:
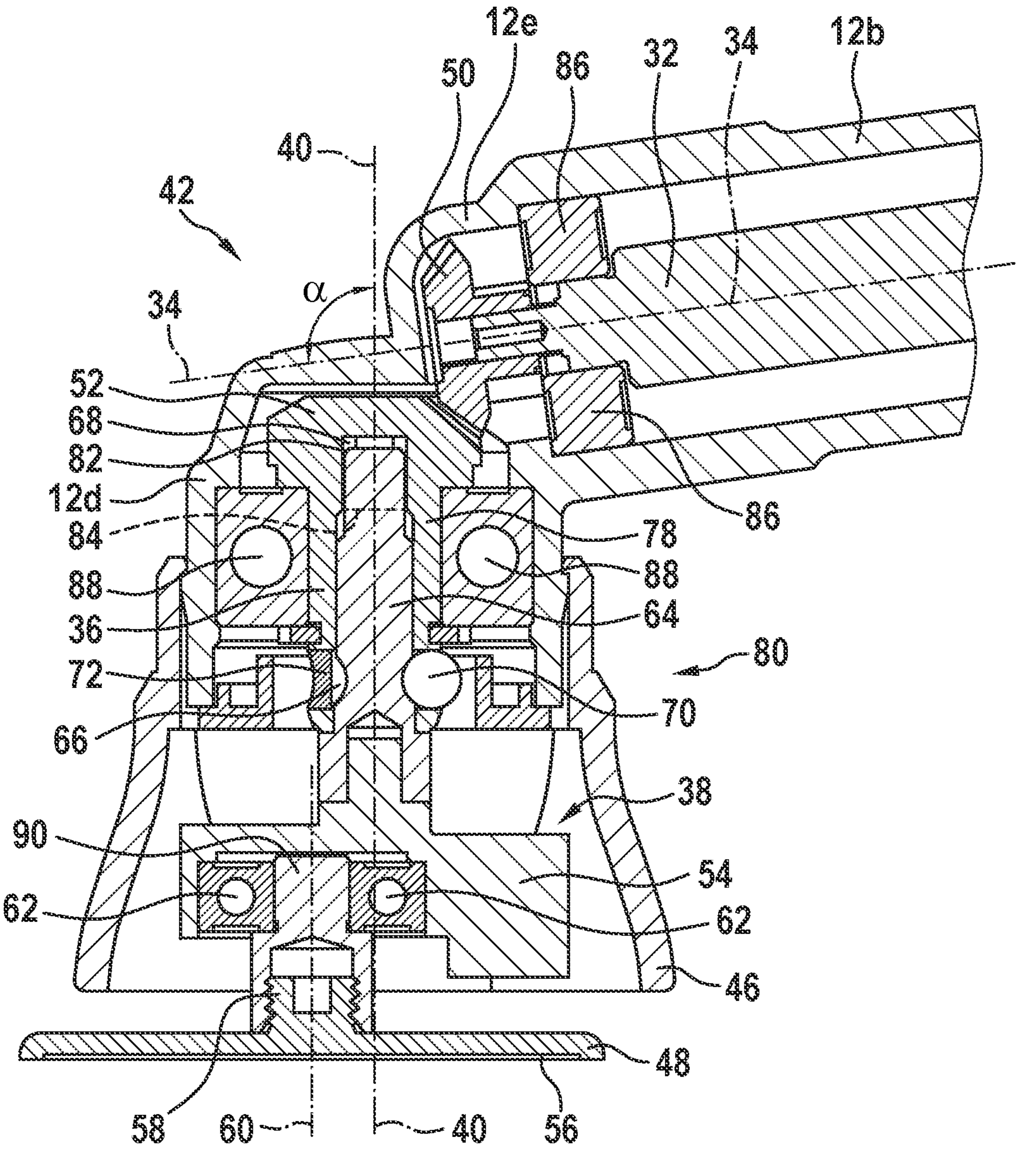
FIG. 6 a tool head of a power tool according to the present invention according to yet another preferred embodiment in a cross-sectional view along a vertical plane.

As can be seen in FIGS. 3 and 6, the second gear mechanism 42 may comprise a bevel gear arrangement with two meshing bevel gear wheels 50, 52. One bevel gear wheel 50 may be attached to the driving shaft 32 or form an integral part therewith. The other bevel gear wheel 52 may be attached to the tool shaft 36 or form an integral part therewith. The bevel gear wheels 50, 52 may be made of a plastic material or metal, e.g., of brass. The bevel gear arrangement 42 could comprise a transmission ratio of larger than 1, smaller than 1 or equal to 1.

In contrast to what has been described above, the first and second gear mechanism could also be designed as a single gear mechanism located between the motor shaft and the tool shaft 36, preferably in the tool head 44. In that case, the single gear mechanism preferably has a transmission ration of ≠1. Alternatively, the power tool 10 according to the present invention may also comprise no gear mechanism at all, in which case the tool shaft 36 would rotate about the same rotational axis and at the same speed as the motor shaft and—if present—the driving shaft 32.

Furthermore, a printed circuit board (PCB) comprising electric and electronic circuitry and components which together form at least part of a control unit may be located inside the housing 12. Preferably, the control unit comprises a microcontroller and/or a microprocessor for processing a computer program which is programmed to perform the desired motor control function, when it is processed on the microprocessor.

In contrast to what has been described above, the power tool 10 could also be equipped with a pneumatic motor, in particular a pneumatic vane motor, instead of the electric motor 24. In that case, pressurized air could be fed to the power tool 10 through an air inlet and forwarded to the pneumatic motor for its operation.

Generally speaking, according to the present invention, a first element is defined, which is constituted by the working element 38 or the tool shaft 36, and a second element is defined, which is constituted by the other one of the two elements, i.e., the tool shaft 36 or the working element 38. At least one locking element 70 is assigned to the first element 36; 38. The locking element 70 is movable in respect to the first element 36; 38 in a radial direction between a retracted position, in which the at least one locking element 70 is retracted in the first element 36; 38, and a locking position, in which the at least one locking element 70 protrudes from the first element 36; 38 radially towards the second element 38; 36. At least one recess 66 with a radial extension is assigned to the second element 38;

36. The at least one radial recess 66 is configured to receive part of the at least one locking element 70 when in its locking position after attachment of the working element 38 to the tool shaft 36. At least one of the following elements, the at least one locking element 70 and the second element 38; 36 in and/or around the at least one radial recess 66, comprises or is made of a magnetic material and the at least other one of the two elements, the second element 38; 36 in and/or around the at least one radial recess 66 and the at least one locking element 70, comprises or is made of a magnetic material or a ferromagnetic material. The at least one locking element 70 is automatically moved into and held in its locking position by means of magnetic force. After attachment of the working element 38 to the tool shaft 36 in the axial direction, the at least one locking element 70 is moved into the at least one radial recess 66 and held therein by means of magnetic force. With other words, due to the at least one locking element 70 engaging with the at least one radial recess 66, the working element 38 is held in respect to the tool shaft 36 in the axial direction. Attachment of the working element 38 to the tool shaft 36 is preferably torque proof such that a torque can be transmitted form the tool shaft 36 to the working element 38.

As can be seen in FIGS. 3 and 6, a first type of working element 38 may comprise an eccentric element 54 and a backing pad 48. The backing pad 48 has a bottom surface 56 configured for releasable attachment of a sanding or polishing member (not shown) thereto, e.g., by means of a Velcro® attachment. A sanding member may comprise a paper, fabric or a plastic foil with abrasive particles embedded in its bottom surface and a corresponding attachment layer on its top surface for releasable attachment to the bottom surface 56 of the backing pad 48. A polishing member may comprise a pad having a bottom surface comprising a sponge or foam material, wool, microfibre or the like and a corresponding attachment layer on its top surface for releasable attachment to the bottom surface 56 of the backing pad 48.

A top surface of the backing pad 48 may comprise a cylindrical pin 58 which is held in the eccentric element 54 in a manner freely rotatable about a second rotational axis 60 of the backing pad 48 extending essentially parallel to the first rotational axis 40 of the tool shaft 36 and in a distance thereto. It is suggested that the cylindrical pin 58 is held directly or indirectly by means of a bearing 62 provided in the bottom surface of the eccentric element 54. In the embodiments of FIGS. 3 and 6, a spindle 90 is held in the bearing 62 in a manner freely rotatable about the second rotational axis 60, and the backing pad 48 is attached to the spindle 90, e.g., by means of the cylindrical pin 58. As shown in FIGS. 3 and 6, attachment of the cylindrical pin 58 to the spindle 90 may be achieved by means of a threaded connection. Alternatively, the attachment could be achieved by means of a screw and/or by magnetic force acting between the backing pad 48 or the cylindrical pin 58, respectively, and the eccentric element 54 or the spindle 90, respectively. It would also be conceivable that the cylindrical pin 58 forms an integral part of the spindle 90. The backing pad 48 is preferably made of a rigid plastic material, metal or the like.

Opposite to the backing pad 48, the eccentric element 54 comprises a further cylindrical pin 64 having at least one radial recess 66 on its external circumferential surface. The further cylindrical pin 64 may be designed separate from the eccentric element 54 and attached thereto in a torque-proof manner, e.g., by means of a threaded connection or the like. In the context of the invention "torque proof" means that a torque can be transmitted at least in one rotational direction between two elements attached to each other, in this case from the further cylindrical pin 64 to the eccentric element 54. However, it is also conceivable that the further cylindrical pin 64 forms an integral part of the eccentric element 54. The further cylindrical pin 64 is preferably made of a ferromagnetic material, e.g., steel or any other suitable metal. The eccentric element 54 may also be made of a non-ferromagnetic metal or a rigid plastic material.

Figure 7:
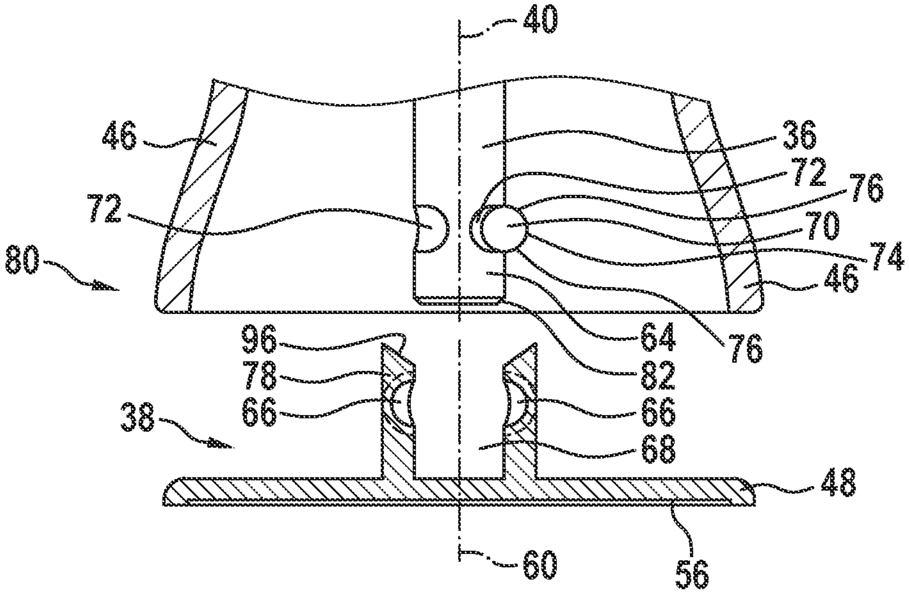
FIG. 7 a backing pad of a second type of working element.
Figure 8:
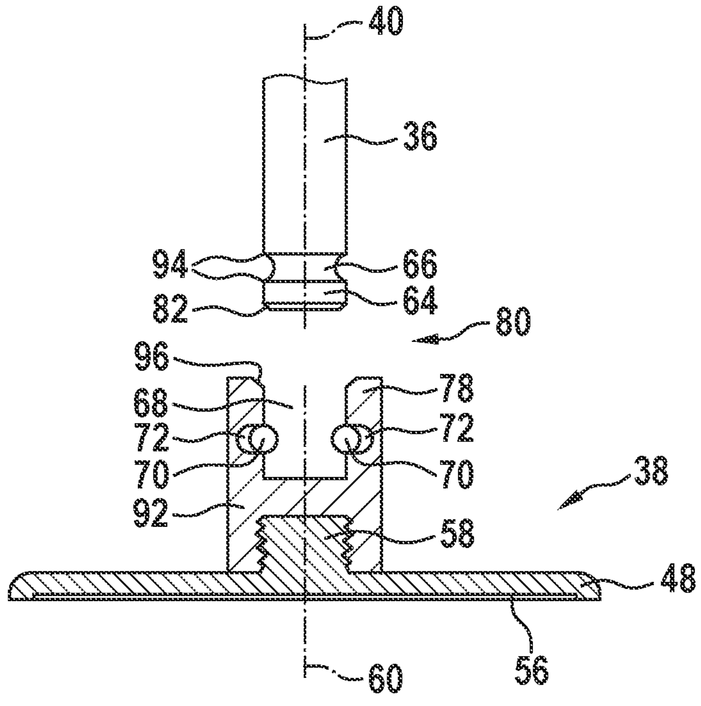
FIG. 8 a backing pad according to another embodiment comprising a cylindrical pin which is attached to or forms an integral part of an extension rod.

A second type of working element, which is shown in FIGS. 7 and 8, may comprise only a backing pad 48 having a bottom surface 56 configured for releasable attachment of a sanding or polishing member thereto. A top surface of the backing pad 48 comprises a cylindrical pin 58 (see FIG. 8) which may be attached to or form an integral part of an extension rod 92. The cylindrical pin 58 or—if present—the extension rod 92 may have at least one radial recess 66 on its circumferential surface. The cylindrical pin 58 or the extension rod 92 is preferably made of a ferromagnetic material, e.g., steel or any other suitable metal.

In the embodiment shown in FIG. 8, the extension rod 92 comprises an axial bore 68 extending along the second rotational axis 60. The at least one radial recess 66 is provided on an internal circumferential surface. In that case, the distal end of the tool shaft 36 comprises a cylindrical pin-shaped section (referred to hereinafter as cylindrical pin 64) which may be inserted into the bore 68 in the axial direction.

In the embodiments shown in FIGS. 3 and 6, the tool shaft 36 has an axial bore 68 for receiving the further cylindrical pin 64 of the first type of working element 38 or the cylindrical pin 58 or an extension rod of the second type of working element 38. The bore 68 is radially delimited by means of a hollow cylindrical jacket 78, preferably making an integral part of the tool shaft 36.

Figure 4:
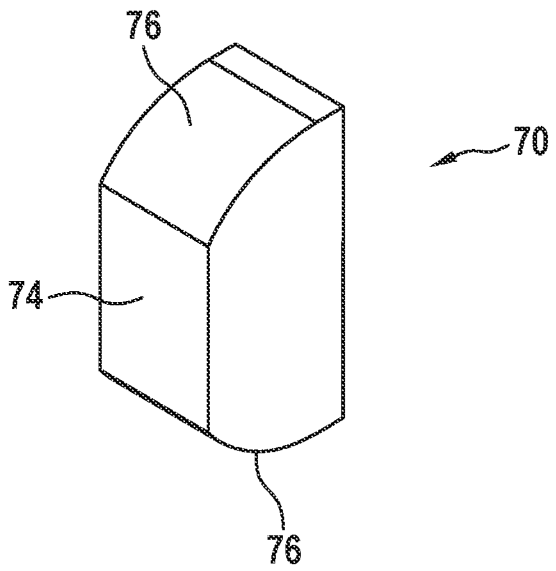
FIG. 4 a locking element of the power tool of FIG. 3 according to a preferred embodiment in a first perspective view.

In general, the first element to which the at least one locking element 70 is assigned, i.e., in the embodiments of FIGS. 3 and 4 the tool shaft 36 or its hollow cylindrical jacket 78, is preferably made of a non-magnetizable material, such as plastic or aluminium, if the at least one locking element 70 is made of a permanent magnetic material.

At least one locking element 70 is held in the hollow cylindrical jacket 78 in a manner movable in a radial direction. In FIGS. 3 and 6 only one locking element 70 on the right of the rotational axis 40 is shown, whereas another locking element on the left opposite to the locking element 70 has been omitted in order to allow easier understanding of the design and functioning of the axial holding arrangement 80 according to the present invention. In particular, on the left of the rotational axis 40, where the other locking element 70 would be located, the hollow cylindrical jacket 78 has a holding receptacle 72 for the other locking element 70. The holding receptacle 72 has a radial extension in order to allow movement of the locking element 70 in the radial direction. Furthermore, the holding receptacle 72 may be designed such that the locking elements 70 will not fall out when the cylindrical pin 58 (or the extension rod) or the further cylindrical pin 64 of the working element 38 is removed out of the bore 68. Of course, further locking elements 70 may be provided in a given circumferential distance, e.g., in a distance of 90°, to the two locking elements 70.

As shown in FIG. 7, the backing pad 48 of the second type of working element 38 could be provided with an axial bore 68 configured to receive a pin-shaped distal end 64 of the tool shaft 36.

In an alternative embodiment, the locking elements 70 were assigned to the working element 38 and the at least one radially extending recess 66 is assigned to the tool shaft 36. If the extension rod 92 or the further cylindrical pin 64 of the working element 38 was provided with an axial bore 68 into which the tool shaft 36 could be introduced in an axial direction, the holding receptacles 72 for the locking elements 70 would preferably be located in a hollow cylindrical jacket 78 radially delimiting the axial bore 68 and making an integral part of the extension rod 92 or the further cylindrical pin 64. The locking elements 70 would be held in the holding receptacles 72 in a manner as to protrude radially inwards towards the rotational axis 60 beyond an inner circumferential surface of the axial bore 68.

Generally speaking, the power tool 10 according to the invention has an axial holding arrangement 80 configured to hold the working element 38 in respect to the tool shaft 36 in an axial direction extending parallel to the rotational axis 40 of the tool shaft 36, when the working element 38 is releasably attached to the tool shaft 36 from outside the tool housing 12 in an axial direction.

According to the present invention, the axial holding arrangement 80 comprises the first element 36; 38 constituted by the tool shaft 36 or the working element 38 and the second element constituted by the other one of the elements, i.e., the working element 38 or the tool shaft 36. The at least one locking element 70 is assigned to the first element 36; 38, and the at least one radial recess 66 is assigned to the second element 38; 36. Thus, in a first embodiment (shown in FIGS. 3, 6 and 7), the first element may be constituted by the tool shaft 36 and the second element may be constituted by the working element 38 or part thereof, i.e., by the cylindrical pin 64 of the first type of working element 38 or by the extension rod 92 of the second type of working element 38. In a second embodiment (shown in FIG. 8), the first element may be constituted by the working element 38 or part thereof, i.e., by the cylindrical pin 64 of the first type of working element 38 or by the extension rod 92 of the second type of working element 38, and the second element is constituted by the tool shaft 36.

The axial holding arrangement 80 comprises at least one locking element 70 held in the first element movably in a radial direction between a retracted position, in which the at least one locking element 70 is retracted in the first element, and a locking position (see FIGS. 3 and 6 to 8), in which the at least one locking element 70 protrudes from the first element radially towards the second element. In FIGS. 3, 6 and 8, in the locking position, the locking elements 70 protrude radially inwards. However, as shown in FIG. 7, in another embodiment, the locking elements 70 could protrude radially outwards in their locking positions.

Furthermore, the axial holding arrangement 80 comprises at least one radial recess 66 provided in the second element, the at least one radial recess 66 being configured to receive at least part of the at least one locking element 70 when in its locking position and when the working element 38 is attached to the tool shaft 36. In FIGS. 3 and 6 only the radial recess 66 on the left of the rotational axis 40 is visible, where the respective locking element 70 has been omitted. In these embodiments the radial recesses 66 are provided on an external circumferential surface of the second element. Alternatively, as shown in FIG. 7, in another embodiment, e.g., when the second element is provided with a bore 68, the radial recesses 66 could also be provided on a circumferential surface of the second element facing radially inwards towards the rotational axis 40, e.g., on an internal circumferential surface of the bore 68.

The at least one locking element 70 or at least part of the second element in and/or around the at least one radial recess 66 is made of a magnetic material. The other one of the at least one locking element 70 or the second element in and/or around the at least one radial recess 66 is made of a magnetic material or a ferromagnetic material. The magnetic material may comprise a permanent magnet material. This leads to a magnetic interaction and attraction between the at least one locking element 70 and the at least one radial recess 66. The at least one locking element 70 is automatically moved into and held in its locking position and in the at least one radial recess 66 by magnetic force, thereby mechanically engaging with the at least one radial recess 66, when the working element 38 is attached to the tool shaft 36, thereby holding the working element 38 in respect to the tool shaft 36 in the axial direction.

If the locking elements 70 are located in a hollow jacket 78 delimiting an axial bore 68 configured to receive a cylindrical pin 64 (see FIGS. 3, 6 and 8), another advantage of the invention is the fact that the locking elements 70 are magnetically attracted by each other even if the working element 38 is not attached to the tool shaft 36 and the cylindrical pin 64 is removed from the axial bore 68. In that case, the locking elements 70 move radially inwards towards each other due to their mutual magnetic attractions. Depending on the dimensions of the locking elements 70, the holding receptacles 72 and the bore 68, the locking elements 70 may even rest against each other.

The locking elements 70 are preferably held in their respective holding receptacles 72 so they cannot fall out into the axial bore of the first element, e.g., into the axial bore 68 of the tool shaft 36 in FIGS. 3 and 6 and into the axial bore 68 of the extension rod 92 in FIG. 8, when the working element 38 and the tool shaft 36 are separated from each other, i.e. when the cylindrical pin 64 is removed from the axial bore 68. However, during an intensive use of the power tool 10 and the axial holding arrangement 80, respectively, the holding receptacles 72 may be worn out to different degrees even up to the extent that one or more of the locking elements 70 is no longer properly held in its respective holding receptacle 72 when the working element 38 and the tool shaft 36 are separated. Due to the magnetic attraction among the locking elements 70, the one or more locking elements 70, which is no longer properly held in its holding receptacle 72, is prevented from falling out of the axial bore 68. Rather, the one or more locking elements 70, which is no longer properly held in its holding receptacle 72, is held in the axial direction by the one or more other locking elements 70, which are still properly held in their holding receptacles 72.

This also prevents that the one or more locking elements 70, which is no longer properly held in its holding receptacle 72, is pushed towards the bottom surface of the axial bore 68 by means of the cylindrical pin 64 upon its insertion into the axial bore 68 in the process of attaching the working element 38 to the tool shaft 36.

To this end, it is particularly advantageous if a distal end surface 82 of the cylindrical pin 64, which is inserted into the axial bore 68 during attachment of the working element 38 to the tool shaft 36, has a tapered, a rounded, e.g., spherical, or a conical form or the form of a truncated cone. Such an end surface 82 automatically pushes the at least one locking element 70 radially outwards into its retracted position during insertion of the cylindrical pin 64 into the axial bore 68. In order to facilitate introduction of the cylindrical pin 64 into the axial bore 68, it is suggested that an outer edge 96 delimiting an entrance hole into the axial bore 68 has a tapered or rounded form (see FIGS. 7 and 8).

Furthermore, it is emphasized that the present invention and in particular the magnetic axial holding arrangement 80 would work perfectly well even if the second element was not made of a magnetic or ferromagnetic material. For instance, in the embodiments of FIGS. 3 and 6, the cylindrical pin 64 having the at least one radial recess 66 could be made of a plastic material or aluminium. The locking elements 70 made of magnetic material would still be attracted by each other in the radial direction towards the rotational axis 40 and, thus, held in their respective recess (es) 66 after attachment of the working element 38 to the tool shaft 36 in the axial direction. In that case the locking elements 70 could be made of a stronger magnetic material in order to create larger magnetic forces amongst each other.

The axial holding arrangement 80 may comprise a discrete radial recess 66 for each of the locking elements 70, each of the radial recesses 66 configured to receive one respective locking element 70 when in its locking position (see FIGS. 3, 6 and 7). Alternatively, the axial holding arrangement 80 may comprise a single annularly shaped radial recess 66, like the one shown in FIG. 8, which is configured to receive all of the locking elements 70 when in their locking positions.

As previously mentioned and shown in FIGS. 3 and 6, the first element may have an axial bore 68 and the at least one locking element 70 is held in a hollow cylindrical jacket 78 of the first element radially delimiting the bore 68. The at least one locking element 70 will move radially inwards towards the rotational axis 40 during transition from its retracted position into its locking position.

Correspondingly, the second element may have a cylindrical pin 58, 64 and the at least one radial recess 66 is provided on an external circumferential surface of the pin 58, 64.

Alternatively, the second element may have an axial bore 68 and the at least one radial recess 66 is provided on an internal circumferential surface of the axial bore 68.

Correspondingly, the first element may have a cylindrical pin 58, 64 and the at least one locking element 70 is held in the pin 58, 64 in a radially movable manner. The at least one locking element 70 will move radially outwards during transition from its retracted position into its locking position.

In order to transmit a torque from the tool shaft 36 to the working element 38, it is suggested that the axial bore 68 and the cylindrical pin 64 each have an axially extending section 84 with a corresponding non-rotational cross-sectional surface. The sections 84 are configured to mechanically engage with each other when the working element 38 is attached to the tool shaft 36 in the axial direction, thereby permitting the transmission of torque from the tool shaft 36 to the working element 38 during operation of the motor 24 of the power tool 10. The non-rotational cross-sectional surface may have an oval form, the form of a triangle, a square or any other type of isosceles polygon, preferably having equal side lengths.

In order to facilitate in particular release of the working element 38 from the tool shaft 36, it is suggested that a distal end surface 74 of the radially movable locking elements 70 facing the second element after attachment of the working element 38 to the tool shaft 36, has a tapered or rounded surface 76 (see FIG. 7) in order to facilitate automatically pushing the locking elements 70 in radial directions into their retracted positions during detachment of the working element 38 from the tool shaft 36 and during a relative axial movement of the locking elements 70 in respect to the at least one recess 66. Similarly, an outer edge 94 (see FIG. 8) delimiting an entry hole into the at least one radially extending recess 66 facing the first element after attachment of the working element 38 to the tool shaft 36, may have a tapered or rounded form in order to facilitate automatically pushing the locking elements 70 in radial directions into their retracted positions during detachment of the working element 38 from the tool shaft 36.

According to a preferred embodiment, the at least one locking element 70 and the at least one radial recess 66 are correspondingly shaped at least in those sections with which they engage (preferably mechanically) with each other in the locking positions of the locking elements 70.

In order to provide for an even distribution of the holding forces acting between the tool shaft 36 and the working element 38, it is suggested that the locking elements 70 are equidistantly positioned in a circumferential direction about the rotational axis 40 of the tool shaft 36, when the working element 38 is attached to the tool shaft 38. Preferably, the axial holding arrangement 80 comprises at least two, preferably at least three, particularly preferred four locking elements 70.

Figure 5:
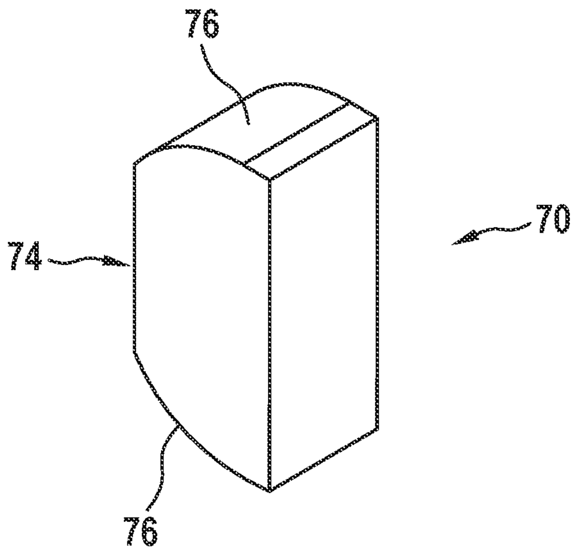
FIG. 5 the locking element of FIG. 4 in a second perspective view.

The locking elements 70 used in the embodiment of FIG. 3 are shown in more detail in FIGS. 4 and 5. In particular, the locking elements 70 have the form of a cuboid where on a rectangular surface 74 of the cuboid opposite edges 76 are tapered or rounded. The locking elements 70 are preferably oriented in such a manner within the axial locking arrangement 80 that the surface 74 with the rounded edges 76 faces the second element and the at least one recess 66. Preferably, the rounded edges 76 of the locking elements 70 face in opposite directions along the rotational axis 40 of the tool shaft 36, i.e., upwards and downwards in FIG. 3, when the rotational axis 40 extends in a vertical direction.

Other shapes of the locking elements 70 are also conceivable. To this end, as shown in FIGS. 6 to 8, the locking elements 70 may have a spherical form. The holding receptacles 72 in the first element and the at least one radial recess 66 in the second element are formed accordingly, in order to hold the spherical locking elements 70 and to receive part of the spherical locking elements 70, respectively.

The invention claimed is:

1. A hand-held power tool (10) comprising a tool housing (12) and a motor (24) located therein and a tool shaft (36) having a rotational axis (40) and actuated by the motor (24) when in operation in order to make the tool shaft (36) perform a rotational movement about its rotational axis (40), a distal end of the tool shaft (36) being accessible from outside the tool housing (12), and further comprising a working element (38) releasably attachable to the distal end of the tool shaft (36) from outside the tool housing (12) in an axial direction extending parallel to the rotational axis (40) of the tool shaft (36) and, after attachment to the tool shaft (36), held in respect to the tool shaft (36) by means of an axial holding arrangement (80), characterized in that the axial holding arrangement (80) comprises:

a first element (36; 38) constituted by one of the following elements, the working element (38) and the tool shaft (36), and a second element (38; 36) constituted by the other one of the elements, the working element (38) and the tool shaft (36), and at least one locking element (70) assigned to the first element (36; 38) movably in a radial direction between a retracted position, in which the at least one locking element (70) is retracted in the first element (36; 38), and a locking position, in which the at least one locking element (70) protrudes from the first element (36; 38) radially towards the second element (38; 36), at least one radial recess (66) assigned to the second element (38; 36) and having a radial extension, the at least one radial recess (66) being configured to receive part of the at least one locking element (70) when in its locking position after attachment of the working element (38) to the tool shaft (36), wherein at least one of the at least one locking element (70) and the second element (38; 36) in, around, or in and around the at least one radial recess (66), comprises a magnetic material, at least one other of the at least one locking element (70) and the second element (38; 36) comprises the magnetic material or a ferromagnetic material, so that the at least one locking element (70) is automatically moved into and held in its locking position and in the at least one radial recess (66) by means of magnetic force after attachment of the working element (38) to the tool shaft (36), thereby engaging with the at least one radial recess (66) and holding the working element (38) in respect to the tool shaft (36) in the axial direction.

2. The hand-held power tool (10) according to claim 1, wherein the first element is the tool shaft (36) and the second element is the working element (38).

3. The hand-held power tool (10) according to claim 2, wherein the first element (36; 38) has an axial bore (68) and the at least one locking element (70) is held in a hollow cylindrical jacket (78) radially delimiting the axial bore (68).

4. The hand-held power tool (10) according to claim 3, wherein the second element (38; 36) has a cylindrical pin (58; 64) and the at least one radial recess (66) is provided on an external circumferential surface of the cylindrical pin (58; 64).

5. The hand-held power tool (10) according to claim 4, wherein either a distal end (82) of the cylindrical pin (58; 64) or an outer edge (96) delimiting an entry hole into the axial bore (68) has, or both the distal end (82) and the outer edge (96) have, a tapered or rounded form in order to facilitate insertion of the cylindrical pin (58; 64) into the axial bore (68) and to automatically push the at least one locking element (70) in a radial direction into its retracted position during insertion of the cylindrical pin (58; 64) into the axial bore (68).

6. The hand-held power tool (10) according to claim 4, wherein the axial bore (68) and the cylindrical pin (58; 64) each having an axially extending section (84) with a corresponding cross-sectional surface without rotational symmetry and being configured to mechanically engage with each other after attachment of the working element (38) to the tool shaft (36), thereby permitting the transmission of torque from the tool shaft (36) to the working element (38) during operation of the motor (24) of the power tool (10).

7. The hand-held power tool (10) according to claim 2, wherein the first element (36; 38) has a cylindrical pin (58; 64) and the at least one locking element (70) is held in an external circumferential surface of the cylindrical pin (58; 64).

8. The hand-held power tool (10) according to claim 7, wherein the second element (38; 36) has an axial bore (68) and the at least one radial recess (66) is provided on an internal circumferential surface of a hollow cylindrical jacket (78) radially delimiting the axial bore (68).

9. The hand-held power tool (10) according to claim 8, wherein either a distal end (82) of the cylindrical pin (58; 64) or an outer edge (96) delimiting an entry hole into the axial bore (68) has, or both the distal end (82) and the outer edge (96) have, a tapered or rounded form in order to facilitate insertion of the cylindrical pin (58; 64) into the axial bore (68) and to automatically push the at least one locking element (70) in a radial direction into its retracted position during insertion of the cylindrical pin (58; 64) into the axial bore (68).

10. The hand-held power tool (10) according to claim 8, wherein the axial bore (68) and the cylindrical pin (58; 64) each having an axially extending section (84) with a corresponding cross-sectional surface without rotational symmetry and being configured to mechanically engage with each other after attachment of the working element (38) to the tool shaft (36), thereby permitting the transmission of torque from the tool shaft (36) to the working element (38) during operation of the motor (24) of the power tool (10).

11. The hand-held power tool (10) according to claim 1, wherein the first element is the working element (38) and the second element is the tool shaft (36).

12. The hand-held power tool (10) according to claim 11, wherein the first element (36; 38) has an axial bore (68) and the at least one locking element (70) is held in a hollow cylindrical jacket (78) radially delimiting the bore (68).

13. The hand-held power tool (10) according to claim 11, wherein the first element (36; 38) has a cylindrical pin (58; 64) and the at least one locking element (70) is held in an external circumferential surface of the cylindrical pin (58; 64).

14. The hand-held power tool (10) according to claim 1 wherein either a distal end surface (74) of the at least one locking element (70) facing the second element (38; 36) after attachment of the working element (38) to the tool shaft (36), or an outer edge (94) delimiting an entry hole into the at least one radial recess (66) facing the first element (36; 38) after attachment of the working element (38) to the tool shaft (36) has, or both the distal end surface (74) and the outer edge (94) have, a tapered or rounded form (76) in order to facilitate automatically pushing the at least one locking element (70) in a radial direction into its retracted position during detachment of the working element (38) from the tool shaft (36).

15. The hand-held power tool (10) according to claim 1, wherein the at least one locking element (70) and the at least one radial recess (66) are correspondingly shaped to engage with each other in the locking position of the at least one locking element (70).

16. The hand-held power tool (10) according to claim 1, wherein the working element (38) comprises an eccentric element (54) which is releasably attached to the tool shaft (36) in the axial direction, and a backing pad (48) attached to a side of the eccentric element (54) opposite to the tool shaft (36) in a manner freely rotatable about a second rotational axis (60) of the backing pad (48), the second rotational axis (60) extending parallel in respect to the rotational axis (40) of the tool shaft (36) and in a distance thereto, or wherein the working element (38) comprises a backing pad (48) which is releasably attached to the tool shaft (36) in the axial direction.

17. The hand-held power tool (10) according to claim 1, wherein at least two locking elements (70) are equidistantly positioned in a circumferential direction about the rotational axis (40) of the tool shaft (36) after attachment of the working element (38) to the tool shaft (36), or the axial holding arrangement (80) comprises at least three locking elements (70), or the at least two locking elements (70) are equidistantly positioned in the circumferential direction about the rotational axis (40) of the tool shaft (36) after attachment of the working element (38) to the tool shaft (36) and the axial holding arrangement (80) comprises the at least three locking elements (70).

18. The hand-held power tool (10) according to claim 1, wherein the axial holding arrangement (80) comprises the same number of one or more radial recesses (66) as there are locking elements (70) provided in the axial holding arrangement (80), or wherein the axial holding arrangement (80) comprises a single annularly shaped radial recess (66) configured to receive one locking element (70) or all of the locking elements (70) in their locking positions.

19. An axial holding arrangement (80) for holding a working element (38) of a hand-held power tool (10) in respect to a tool shaft (36) of the power tool (10) in an axial direction extending parallel to a rotational axis (40) of the tool shaft (36), after releasable attachment of the working element (38) to a distal end of the tool shaft (36) in the axial direction, characterized in that the axial holding arrangement (80) comprises a first element (36; 38) constituted by one of the following elements, the working element (38) and the tool shaft (36), and a second element (38; 36) constituted by the other one of the elements, the working element (38) and the tool shaft (36), and at least one locking element (70) assigned to the first element (36; 38) movably in a radial direction between a retracted position, in which the at least one locking element (70) is retracted in the first element (36; 38), and a locking position, in which the at least one locking element (70) protrudes from the first element (36; 38) radially towards the second element (38; 36), at least one radial recess (66) assigned to the second element (38; 36), the at least one radial recess (66) being configured to receive part of the at least one locking element (70) when in its locking position and after attachment of the working element (38) to the tool shaft (36), wherein at least one of the at least one locking element (70) and the second element (38; 36) in, or around, or in and around the at least one radial recess (66), comprises a magnetic material, and at least one other of the at least one locking element (70) and the second element (38; 36) comprises the magnetic material or a ferromagnetic material, so that the at least one locking element (70) is automatically moved into and held in its locking position and in the at least one radial recess (66) by means of magnetic force after attachment of the working element (38) to the tool shaft (36), thereby engaging with the at least one radial recess (66) and holding the working element (38) in respect to the tool shaft (36) in the axial direction.

20. A working element (38) of a hand-held power tool (10), configured for releasable attachment to a distal end of a tool shaft (36) of the power tool (10) in an axial direction extending parallel to a rotational axis (40) of the tool shaft (36) and further configured to be held in respect to the tool shaft (36) in the axial direction by means of an axial holding arrangement (80), after attachment of the working element (38) to the tool shaft (36) in the axial direction, characterized in that the working element (38) comprises a first element, wherein a second element makes part of the tool shaft (36), or the working element (38) comprises a second element, wherein a first element makes part of the tool shaft (36), and if the working element (38) is the first element, at least one locking element (70) is assigned to the working element (38) movably in a radial direction between a retracted position, in which the at least one locking element (70) is retracted in the working element (38), and a locking position, in which the at least one locking element (70) protrudes from the working element (38) radially towards the tool shaft (36), wherein at least one radial recess (66) is assigned to the tool shaft (36), the at least one radial recess (66) being configured to receive part of the at least one locking element (70), when in its locking position and after attachment of the working element (38) to the tool shaft (36), or if the working element (38) is the second element, at least one radial recess (66) is assigned to the working element (38), the at least one radial recess (66) being configured to receive part of the at least one locking element (70), wherein the at least one locking element (70) is assigned to the tool shaft (36) movably in a radial direction between a retracted position, in which the at least one locking element (70) is retracted in the tool shaft (36), and a locking position, in which the at least one locking element (70) protrudes from the tool shaft (36) radially towards the working element (38), when the at least one locking element (70) is in its locking position and after attachment of the working element (38) to the tool shaft (36), wherein at least one of the at least one locking element (70) and the second element (38; 36) in, or around, or in and around the at least one radial recess (66), comprises a magnetic material, and at least one other of the at least one locking element (70) and the second element (38; 36) comprises the magnetic material or a ferromagnetic material, so that the at least one locking element (70) is automatically moved into and held in its locking position and in the at least one radial recess (66) by means of magnetic force after attachment of the working element (38) to the tool shaft (36), thereby engaging with the at least one radial recess (66) and holding the working element (38) in respect to the tool shaft (36) in the axial direction.

21. The working element (38) according to claim 20, wherein the working element (38) comprises an eccentric element (54) which is releasably attachable to the tool shaft (36) in the axial direction, and a backing pad (48) attached to a side of the eccentric element (54) opposite to the tool shaft (36) in a manner freely rotatable about a second rotational axis (60) of the backing pad (48), the second rotational axis (60) extending parallel in respect to the rotational axis (40) of the tool shaft (36) and in a distance thereto, or wherein the working element (38) comprises a backing pad (48) which is releasably attachable to the tool shaft (36) in the axial direction.

* * * * *